United States Patent

Loparo et al.

[11] Patent Number: 5,980,080
[45] Date of Patent: Nov. 9, 1999

[54] WINDUP AND NOISE PROTECTION OF DIGITAL CONTROLLERS IN A LAYERED CONTROL

[75] Inventors: Kenneth A. Loparo, Chesterland; Gregory Khrapunovich, Beachwood; Douglas E. Kyr, Road River; Thomas J. Scheib, Chesterland, all of Ohio

[73] Assignee: Elsag International N.V., Amsterdam, Netherlands

[21] Appl. No.: 08/995,828

[22] Filed: Dec. 22, 1997

[51] Int. Cl.⁶ .................................................. G05B 13/00
[52] U.S. Cl. ...................... 364/148.1; 364/153; 364/157; 364/148.07
[58] Field of Search ................................... 364/137, 153, 364/157, 161, 162, 148.01, 148.07, 164, 610, 148.08, 148.09, 148.1; 308/609

[56] References Cited

U.S. PATENT DOCUMENTS

| | | |
|---|---|---|
| 5,394,322 | 2/1995 | Hansen ..................................... 364/148 |
| 5,448,076 | 9/1995 | Krause ..................................... 250/551 |
| 5,631,824 | 5/1997 | Khorrami ................................. 364/176 |
| 5,650,927 | 7/1997 | Guckenheimer ........................ 364/176 |
| 5,704,011 | 12/1997 | Hansen et al. ............................. 706/25 |
| 5,867,384 | 2/1999 | Drees et al. . |

OTHER PUBLICATIONS

Kothare et al., "A Unified Framework for the Study of Anti–windup Designs", 1994, pp. 1869–1883, Automatica, vol. 30, No. 12.

Peng et al. "Anti–Windup, Bumpless, and Conditioned Transfer Techniques for PID Controllers", Aug. 1996, pp. 48–57, IEEE Control Systems.

Åström et al. "Computer Controlled Systems", 1984, pp. 369–373, Prentice–Hall.

Katebi et al. "Minimum Variance Control", 1995, pp. 1089–1096, The Control Handbook, CRC Press.

"Function Code 156 — Advanced PID Controller", Feb. 15, 1995, pp. 1–17, Bailey Infi 90 E96–200 Instruction — Function Code Application Manual.

*Primary Examiner*—William Grant
*Assistant Examiner*—Ivan Calcano
*Attorney, Agent, or Firm*—Michael M. Rickin

[57] ABSTRACT

Anti-windup and noise protection that can be used with any general digital controller. The anti-windup technique allows the implementation of noise filtering techniques to decrease or eliminate chatter of the control output at the limit. In a higher order controller that uses a feedforward signal, the anti-windup technique prevents an unexpected change in the control output when a step change occurs in the feedforward signal. The technique can be used to provide anti-windup protection in both single layer and multi-layer control schemes.

14 Claims, 7 Drawing Sheets

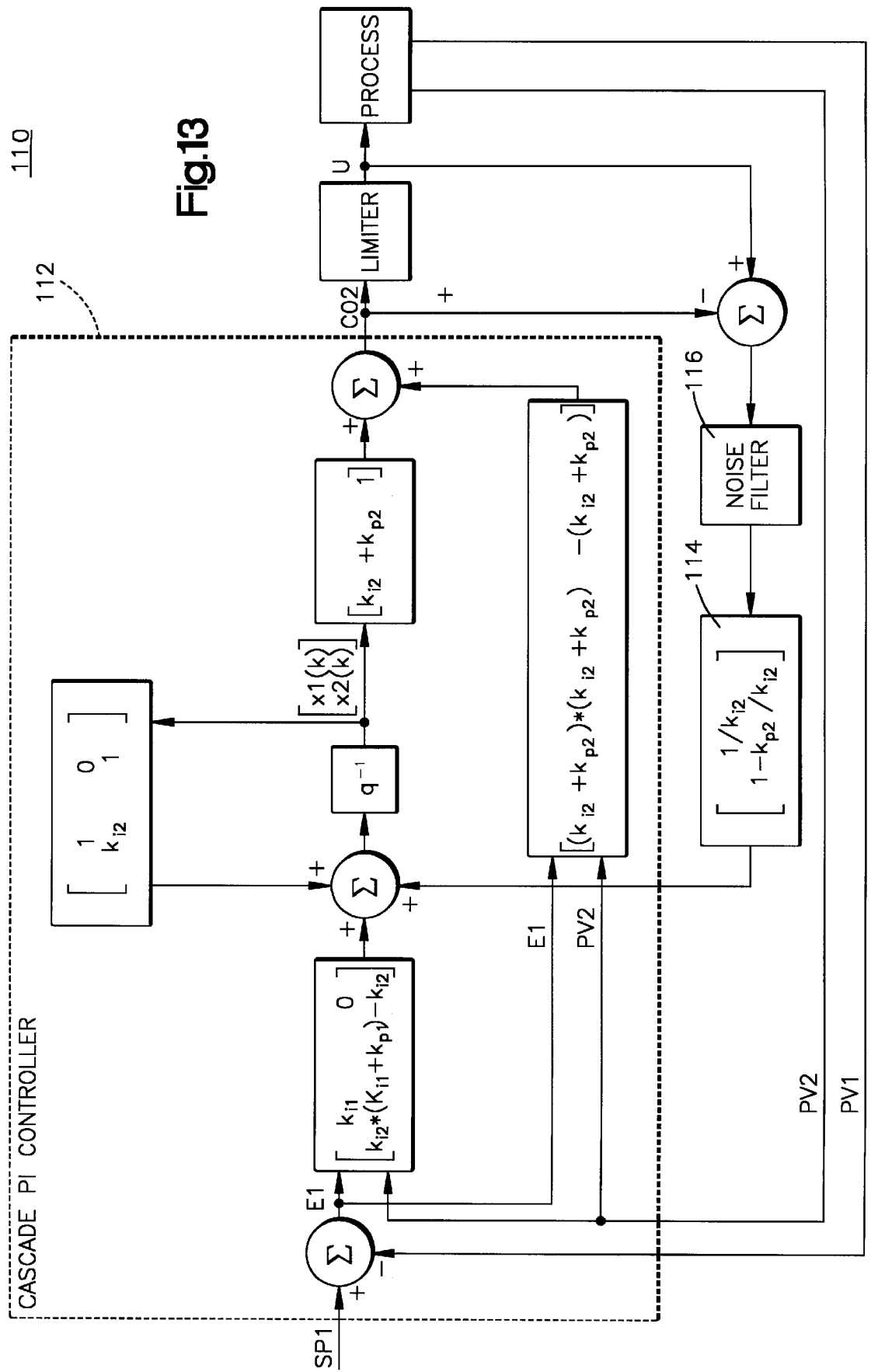

WINDUP AND NOISE PROTECTION OF DIGITAL CONTROLLERS IN A LAYERED CONTROL

FIELD OF THE INVENTION

This invention relates to digital controllers, and more particularly, to windup and noise protection of those controllers in a control system.

DESCRIPTION OF THE PRIOR ART

Controllers are used in process control systems to maintain a control device at a desired setting. As is well known the controller receives the desired value of the controlled process known as the setpoint (SP) from a source such as an operator and the present measurement of the controlled process known as the process variable (PV) from the process and calculates therefrom a control output (CO). The CO is connected to the control device, such as a valve, to thereby adjust the value of the controlled process, for example the flow in the pipe to which the valve is connected, to the SP.

The CO of the controller is limited due to the limitations of the control device. Those limitations may include high and low limits and a rate limit as well as other limits. When the CO is at a limit there exists a well known phenomenon, known as controller windup, which is related to behavior of the controller. With the external CO at a limit, the internally calculated CO (before limiting) may increase indefinitely which will adversely affect the controlled process.

In a control scheme using only a single controller, windup can be prevented by directly incorporating the limits of the control device, if they are known, in the design of the controller.

Modern control systems usually use control schemes that include a plurality of layers. In such schemes, for example, the well known two layer cascade control system 10 shown in FIG. 1, each controller 12, 14 receives its own PV, PV1 and PV2, from the controlled process 18. Controller 12, also known as the outer controller, receives the SP, SP1, from an operator. Controller 12 calculates from SP1 and PV1 the CO, CO1, which becomes the SP, SP2, for controller 14, also known as the inner controller. Controller 14 may also incorporate a feedforward (FF) signal as is shown in FIG. 1. The CO, CO2, from controller 14 is sent to the control device 16.

As was described above, system designers in a single controller scheme can incorporate the limits of the control device, if they are known, in the single controller to prevent windup. In the two layer control scheme shown in FIG. 1, the system designer can apply the limits of the control device, if they are known, to controller 14 to prevent windup in that controller. It is not easy in such a scheme for the system designer to apply the known limits of the control device to controller 12 to prevent windup in that controller.

In general, in a layered control scheme employing two or more controllers, windup can be prevented in the lowest layer controller by incorporating therein the known limits of the control device. It is not easy, however, in such a layered control scheme to apply the known limits to the higher layer controllers to prevent windup of those controllers.

A number of techniques exist in the prior art for preventing windup. A general framework for the analysis of anti-windup control techniques has been proposed by Kothare et al. in *A Unified Framework for the Study of Anti-windup Designs,* Automatica, Vol. 30, No. 12, pp. 1869–1883, 1994. Most of the presently existing anti-windup control techniques have been developed for use in proportional-integral-derivative (PID) controllers. A survey of these anti-windup control schemes for PID controllers can be found in *Anti-Windup, Bumpless, and Conditioned Transfer Techniques for PID Controllers,* Peng et al., IEEE Control Systems, pp. 48–57, August 1996.

Some of the anti-windup control techniques proposed for use in PID controllers require direct access to the integrator in the PID controller. These techniques cannot be applied to a general digital controller, where in contrast to a PID controller, an integrator may not be present in the controller as a separate unit.

Astrom and Wittenmark have proposed in *Computer Controlled Systems,* Prentice-Hall, 1984, an observer based anti-windup technique which can be applied to any linear controller. This technique uses the error between the calculated CO and the CO after limiting to modify the internal states of the controller through linear feedback. When the CO is not at the limit, the controller behaves as originally designed. When the CO is limited, the internal states of the controller are modified to drive the calculated CO to the limited value.

The biggest drawback with all of the known anti-windup techniques suitable for use with general digital controllers and with most of the techniques suitable for use with PID controllers is that the CO becomes sensitive to noise when the output is at the saturation limit. This sensitivity will be described below in connection with FIGS. 2 and 3 for a single controller control scheme. In addition to the sensitivity to noise of the CO in the observer based anti-windup technique first proposed by Astrom et al., a step change in the FF input (see FIG. 1) may result in an unexpected change of the CO if the CO is at a limit.

Referring now to FIG. 2, there is shown the SP, PV and CO of a single controller control scheme in the absence of noise and with the CO limits set at −1.3 and +1.3. The SP is initially one and the process gain of the control scheme is 0.6. As is well known to those in the art, the required CO is the SP divided by the process gain or in this example 1.0/0.6=1.67. Since the CO upper limit in this single controller control scheme is set at +1.3, the required CO cannot be reached and the actual CO stops at 1.3 as is shown in FIG. 2. Therefore, the PV cannot reach the SP of 1.0 and stays as is shown in FIG. 2 at approximately 0.78.

Referring now to FIG. 3, there is shown the SP, PV and CO in the presence of noise for the single controller control scheme whose SP, PV and CO are illustrated in FIG. 2 in the absence of noise. As can be seen from FIG. 3, the CO chatters in the presence of noise near the CO upper limit of +1.3. This chattering of the CO is a result of the particular anti-windup technique used in the control scheme. The technique, which is well known to those in the art, back calculates the controller state based on the value of the CO. The side effect of this calculation is the increased sensitivity of the CO to noise.

It should be noted that since as was discussed in connection with FIG. 2, the PV never reaches the SP, the CO as is shown in FIG. 2 should remain fixed at the upper limit and not chatter until the SP is changed. The CO does, however as is shown in FIG. 3, chatter at the upper limit. The chattering of the CO at the upper limit will negatively affect the operation of this or any other control system in which the chattering occurs.

While FIG. 3 has illustrated the chattering of the actual CO at the upper limit in the presence of noise as a result of the anti-windup technique used in the system, it should be appreciated that chattering will also occur in the actual CO in the presence of noise when, as is shown in that part of FIG. 3 to the right of t=40 seconds, the SP is such as to drive the actual CO to the lower limit of −1.3. It should further be appreciated that while FIG. 3 illustrates chattering of the actual CO at the upper limit in the presence of noise in a single controller control scheme, chattering of the actual CO at the upper limit and the lower limit will also occur in the presence of noise in a control scheme having a plurality of layers.

There are anti-windup techniques in addition to those described above. One such technique known to those in the art is that used in controllers manufactured by the Elsag Bailey group of companies. In the control system 10 shown in FIG. 1, this technique adds special feedback, not shown in FIG. 1, from inner controller 14 to outer controller 12. The special feedback occurs when inner controller 14 reaches either its high or low output limit.

When inner controller 14 reaches its high output limit, that controller activates a signal, known as Inhibit Increase, to outer controller 12. Upon receiving the Inhibit Increase signal, the outer controller 12 copies the previous value of its output into the high output limit. This prevents outer controller 12 from any further increase of its output.

When inner controller 14 reaches its low output limit, that controller activates a signal, known as Inhibit Decrease, to outer controller 12. Upon receiving the Inhibit Decrease signal, the outer controller 12 copies the previous value of its output into the low output limit. This prevents outer controller 12 from any further decrease of its output.

As was described in connection with FIGS. 2 and 3, the chattering of the CO at the upper limit and at the lower limit will negatively affect the operation of the control system in which the chattering occurs. When the output limiting is due to the Inhibit Increase or Inhibit Decrease command, the chattering of the CO at the output limit can have an additional effect on the operation of the control system. The is shown in FIG. 4 where the SP and CO are shown for the controller 12 of FIG. 1 and with the Inhibit Increase signal activated at t=15 seconds and t=65 seconds. The PV is not shown for sake of clarity.

As can be seen from FIG. 4, the CO starts to go down when the Inhibit Increase signal becomes active at either t=15 seconds or t=65 seconds and continues to decrease for as long as that signal remains active. This behavior is caused by the interaction of the Inhibit Increase signal and the CO chatter. When the CO decreases due to noise, the Inhibit Increase signal makes the controller 12 use the decreased value as the new high limit. Obviously this behavior of the CO negatively affects the controlled process.

It is desirable to have windup protection suitable for use with any general digital controller that is insensitive to noise. As can be appreciated from the discussion of the prior art no such windup protection technique presently exists.

SUMMARY OF THE INVENTION

A method for preventing windup in a control system. The control system has a single controller characterized by the general linear transfer function $B(q)/A(q)$. The controller has a control output before limiting. The control system also has a limiting device responsive to the control output before limiting for providing a control output after limiting, and a summing point for providing an error signal which is the difference between a setpoint and a process variable to the input of the controller.

The method comprises the steps of:

a. implementing a transfer function in the form of:

$$[A_0(q)-A(q)]/B(q)$$

where $A_0(q)$ is the characteristic polynomial of the anti-windup observer and $B(q)$ and $A(q)$ are the numerator and denominator in the general linear transfer function $B(q)/A(q)$; and b. connecting the implemented transfer function to the control system so that the implemented transfer function receives as an input signal the difference between the control output after limiting and the control output before limiting and provides an output signal additively to the error signal.

The present invention may also be embodied as a method for preventing windup in a control system for a process. The control system has N controllers, where $N \geq 2$. Each of the controllers is in a respective one of N layers ranging from lowest to highest. Each of the N controllers has an associated control output and inputs which are a setpoint and a process variable. The control system also has a limiter for providing from the control output from the lowest layer controller a limited control output to the process. The process variable for each of the N controllers is from the process. Each of the N controllers, except for the controller in the lowest layer, providing the associated control output as the setpoint input for the one of the N controllers which is in the next adjacent lower layer. The setpoint input for the one of the N controllers in the highest of the N layers received from a source external to the control system.

The method comprising the steps of:

a. representing each of the N controllers by a state space description;

b. combining the state space description representing N controllers into a single multivariable controller having a setpoint input which is the setpoint input from the external source, a control output which is the lowest layer controller control output, and the process variable for each of the N controllers from the process;

c. applying to the single multivariable controller an observer based anti-windup technique which has an input; and d. including a noise filter connected to the input of the observer based anti-windup technique.

The present invention may further be embodied as a method for preventing windup in a control system for a process. The control system has N controllers where $N \geq 2$. An ith of the N controllers having a setpoint $SP_i$, a process variable $PV_i$ from the process and a control output $CO_i$ for each i such that $1 \leq i \leq N$. The control output of the ith controller is connected to the setpoint of the adjacent controller such as $CO_i = SP_{i+1}$ for each i such that $1 \leq i \leq N-1$. The setpoint of controller 1, $SP_1$, is from a source external to the control system and the control output of the Nth controller, $CO_N$, is connected to a limiter whose output is connected to the process.

The method comprising the steps of:

a. representing each of the N controllers by a state space description;

b. combining the state space description representing N controllers into a single multivariable controller having a setpoint input which is the setpoint of controller 1, $SP_1$, a control output which is the control output of the Nth controller, $CO_N$, and the process variable for each of the N controllers from the process;

c. applying to the single multivariable controller an observer based anti-windup technique having an input; and d. including a noise filter connected to the input of the observer based anti-windup technique.

The control system comprises:

a. a single controller characterized by the general linear transfer function B(q)/A(q), the controller having a control output before limiting;

b. a limiting device responsive to the control output before limiting for providing a control output after limiting;

c. a first summing point for providing an error signal which is the difference between a setpoint and a process variable to the input of the controller; and d. an anti-windup preventing device having an anti-windup transfer function in the form of:

$$[A_0(q)-A(q)]/B(q)$$

where $A_0(q)$ is the characteristic polynomial of the anti-windup observer and B(q) and A(q) are the numerator and denominator in the general linear transfer function B(q)/A(q), the anti-windup preventing device receiving as an input signal the difference between the control output after limiting and the control output before limiting and providing an output signal additively to the error signal.

DESCRIPTION OF THE DRAWING

FIG. 13 shows the two layer control system of FIG. 11 where the two controllers are PI controllers which have been combined into a single multivariable controller.

DESCRIPTION OF THE PREFERRED EMBODIMENT(S)

Figure 5:
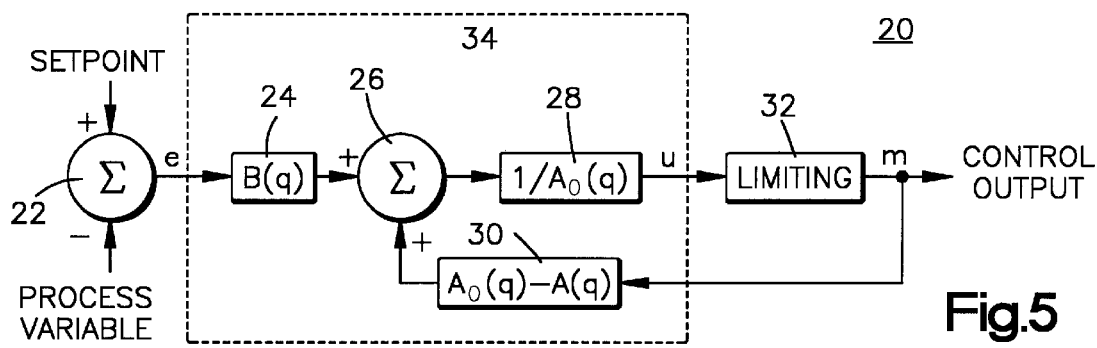
FIG. 5 shows a block diagram for a single controller control scheme that implements the prior art observer based anti-windup technique.

Referring now to FIG. 5, there is shown a block 20 diagram of a single controller control system 20 that includes the observer based anti-windup technique first proposed by Astrom et al. System 20 has a first mixing point 22 whereat a SP and a PV are combined to provide an input e, which is the difference between the SP and the PV, to a controller 34. As is shown in FIG. 5, controller 34 includes blocks 24, 28 and 30.

System 20 has a second mixing point 26 between the output of block 24 and the input of block 28. Mixing point 26 receives the output of block 24 and the output of block 30. Block 30 has its input connected to the CO. The output of second mixing point 26 is connected to the input of block 28. Block 28 provides an output u to the input of limiter 32. The output m of limiter 32 is the CO of system 20.

The controller 34 implements the general linear transfer function B(q)/A(q). The observer based anti-windup technique first proposed by Astrom et al. provides an adjustment internal to controller 34 in the form of the anti-windup observer with characteristic polynomial $A_0(q)$. This internal adjustment is provided by block 28 which implements the transfer function $1/A_0(q)$ and block 30 which implements the transfer function $A_0(q)-A(q)$. Block 24 implements the transfer function B(q).

The observer based anti-windup technique has tunable parameters which are represented by the characteristic polynomial of the anti-windup observer. It is up to the individual (s) implementing the anti-windup technique to select the parameters for $A_0(q)$. In practice this is not easy to do.

The general recommendation for using the observer based anti-windup technique is to implement the easiest polynomial which is the polynomial for the fastest observer, known as the deadbeat observer. The drawback to using that polynomial is that it has the worst noise characteristic of all of the polynomials used in the technique. If the individual(s) implementing the technique succeed in implementing a polynomial for other than the deadbeat observer that polynomial must be tuned each time the controller is tuned.

Therefore, the observer based anti-windup technique of the prior art leaves the control system designer with choosing either an easy to implement polynomial with poor noise characteristics or a difficult to implement polynomial that must be re-tuned each time the controller is tuned. Neither choice is satisfactory.

Figure 6:
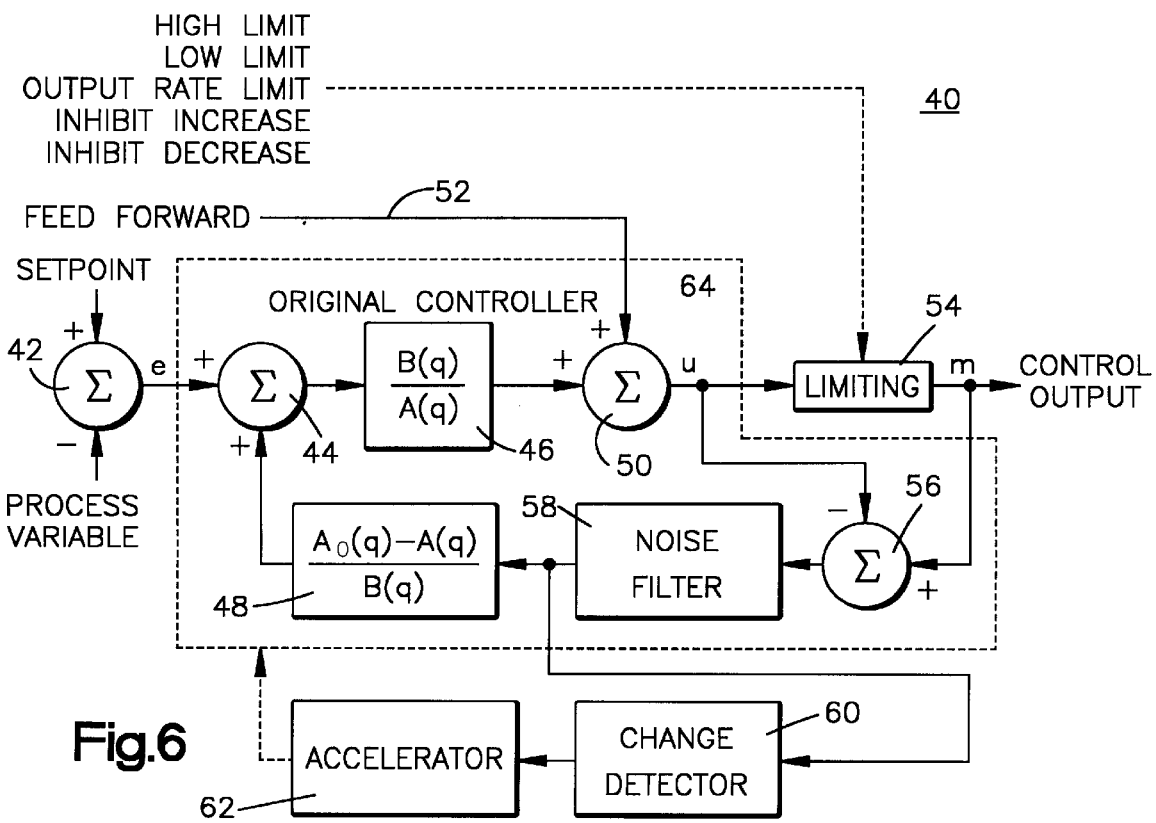
FIG. 6 shows a block diagram for a single controller control system that includes one embodiment of the noise insensitive anti-windup protection technique of the present invention.
Figure 2:
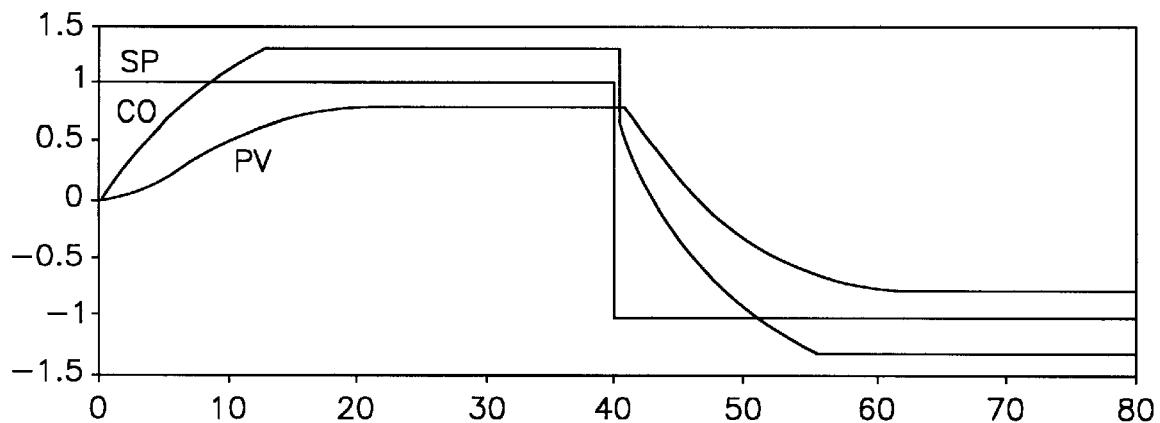
FIG. 2 shows the SP, PV and CO of a single controller control scheme in the absence of noise.

Referring now to FIG. 6, there is shown a block diagram of a single controller control system 40 that includes one embodiment of the noise insensitive anti-windup protection technique of the present invention. FIG. 6 includes a controller 46. One benefit of the present invention over the technique of the prior art described above can immediately be seen by comparing FIGS. 5 and 6. The present invention provides an adjustment which is external to controller 46 as compared to the internal adjustment to controller 34 provided by the prior art technique shown in FIG. 5. Therefore, the anti-windup technique of the present invention does not compromise the integrity of controller 46

System 40 includes a first summing point 42 where the PV and SP are summed to provide an error signal e which is the difference between the SP and the PV. The signal e is connected to a second summing point 44 which also receives an input from block 48 which implements the anti-windup device. The controller 46 receives its input from the second summing point 44 and provides an output to a third summing point 50 which also receives the feedforward (FF) signal 52 as an input. The incorporation of the FF signal in system 40 is another benefit of the present invention over the system shown in FIG. 5 that uses the prior art anti-windup technique.

The output of summing point 50 is connected to limiter 54 whose output m is the CO of system 40. The output u of third summing point 50 is also connected to a fourth summing point 56 which also receives the CO as an input. Summing point 56 provides an output signal which is the difference between the CO before and after limiting to a noise filter 58. Noise filter 58 is connected to anti-windup device block 48. Block 48 implements the transfer function:

$$[A_0(q)-A(q)]/B(q)$$

where $A_0(q)$ is the characteristic polynomial of the anti-windup observer and B(q) and A(q) are the numerator and denominator in the general linear transfer function B(q)/A(q).

The anti-windup technique of the present invention used in system 40 has an important advantage over the prior art anti-windup technique used in system 20 of FIG. 5. The technique used in system 40 directly includes the difference between u, which is the CO before limiting, and m, which is the CO after limiting. This advantage allows the use of noise filtering techniques which are implemented by noise filter 58 to decrease or eliminate output chatter of the CO at the limit.

As is well known by those skilled in the art, the simplest and most effective way to eliminate noise is to use a noise filter 58 that implements a deadband DB. This embodiment for noise filter 58 implements the following relationship between the Input and Output of filter 58:

$$\text{Output} = \begin{cases} 0 & -DB \leq \text{Input} \leq DB \\ \text{Input} - DB & \text{Input} > DB \\ \text{Input} + DB & \text{Input} < -DB \end{cases}$$

In this embodiment for noise filter 58, the anti-windup device 48 will ignore the small differences between m, the CO after limiting and u, the CO before limiting. In addition, if the range of the deadband DB is greater than the noise magnitude, this implementation of filter 58 will completely eliminate noise. Since the deadband reduces or eliminates noise, the characteristic polynomial of the anti-windup observer can be implemented in a simple deadbeat form as:

$$A_0(q)=q^n$$

As those skilled in the art will appreciate, in the absence of noise filter 58, the structure of system 40 is equivalent to the structure of system 20 of FIG. 5. In that instance, the relationship between u, e and m in both systems can be expressed as:

$$u = \frac{B(q)e + (A_0(q) - A(q))m}{A_0(q)}$$

System 40 of FIG. 6 also includes a change detector 60 the input of which is connected to the output of noise filter 58 and an accelerator 62 which is connected to the output of change detector 60. As can be seen from FIG. 6, system 40 also includes a controller 64 which is the combination of summing points 44, 50 and 56; controller 46; block 48; and noise filter 58. As will be described in more detail below, detector 60 and accelerator 62, upon the occurrence of certain conditions, cause the controller 64 to execute the observer calculations.

Figure 3:
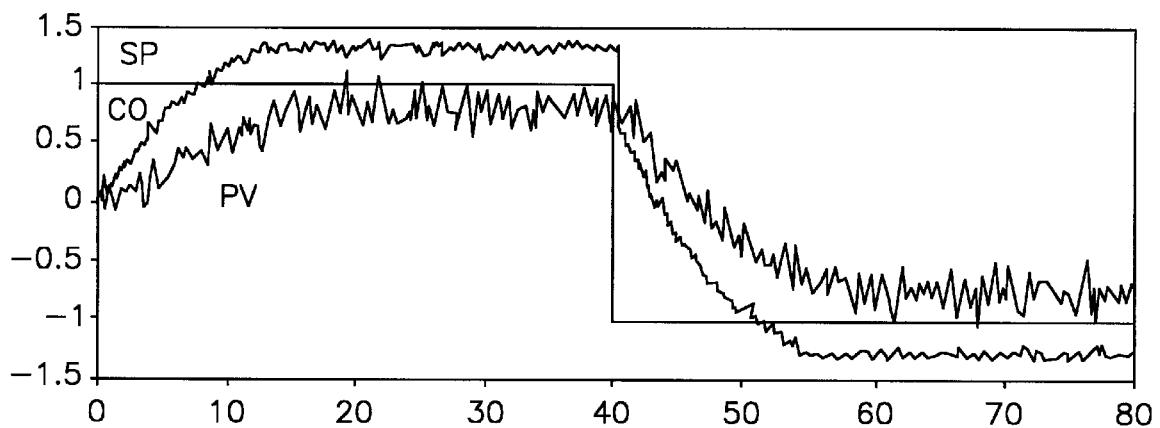
FIG. 3 shows the SP, PV and CO in the presence of noise for the same single channel controller scheme whose SP, PV and CO are illustrated in FIG. 2 in the absence of noise.
Figure 7:
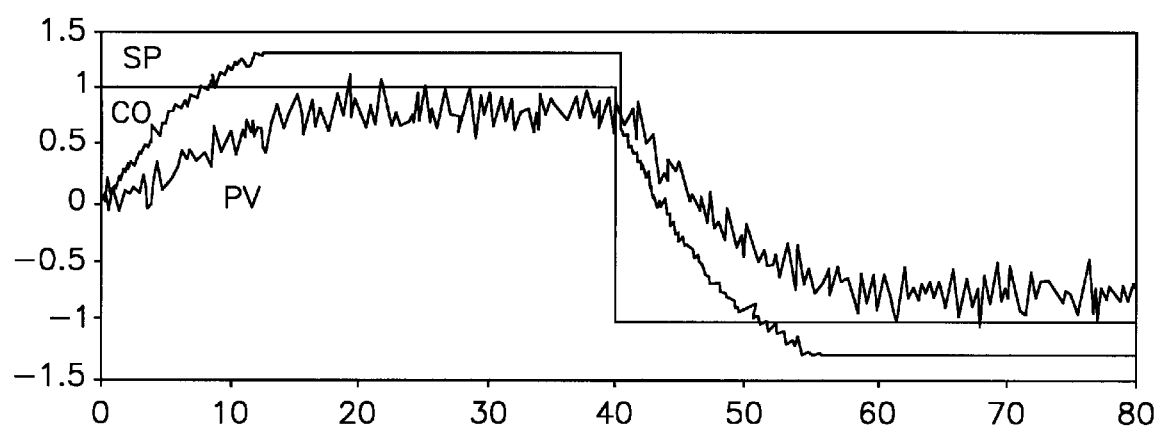
FIG. 7 shows the SP, PV and CO in the presence of noise for the system shown in FIG. 6.

Referring now to FIG. 7, there is shown the SP, PV and CO in the presence of noise for the single controller control scheme 40 using the anti-windup technique of the present invention with DB=0.15 for the same conditions as are shown in FIG. 3 for a single controller control scheme using an anti-windup technique of the prior art. As can be seen from a comparison of FIGS. 7 and 3, the anti-windup technique of the present invention allows the CO to stay at the upper or lower limit and not chatter in the presence of noise.

Figure 4:
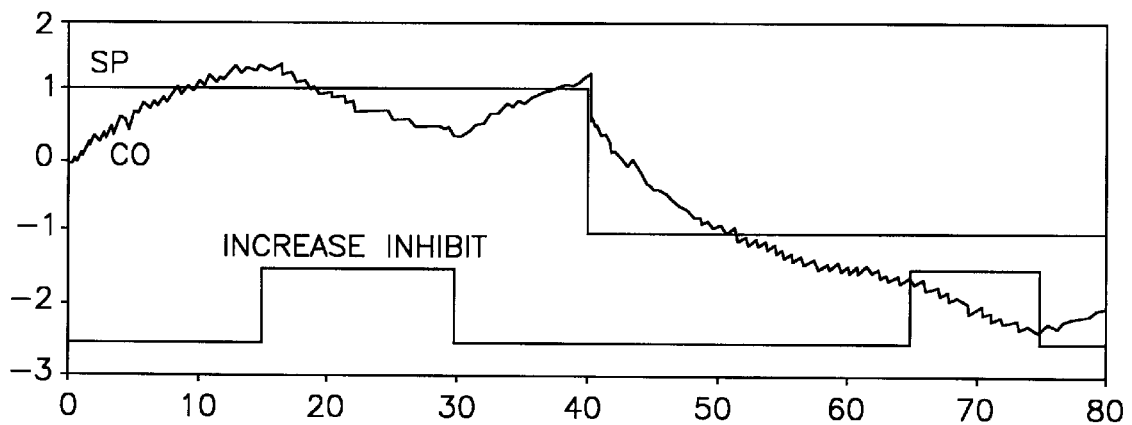
FIG. 4 shows the SP and CO of the outer controller in the two layer cascade control system using a prior art anti-windup technique in the presence of noise.
Figure 8:
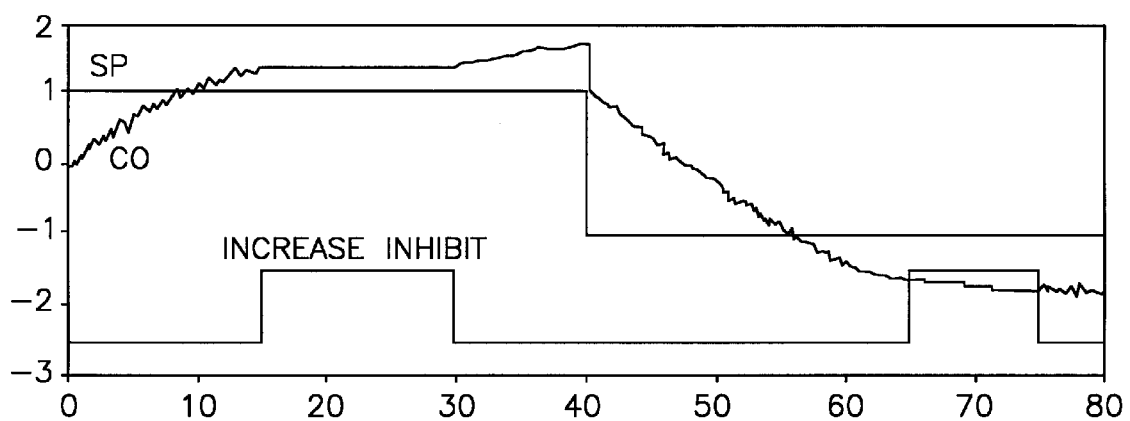
FIG. 8 shows the SP and CO of the outer controller in the two layer cascade control system under the same conditions as in FIG. 4 except that the controller uses the anti-windup technique of the present invention.

Referring now to FIG. 8, there is shown the SP and CO in the presence of noise for the cascade controller control scheme 40 which uses the anti-windup technique of the present invention and the Inhibit Increase command for the same conditions as are shown in FIG. 4 for a cascade controller control scheme using the Inhibit Increase command and an anti-windup technique of the prior art. As can be seen from a comparison of FIGS. 8 and 4, the decrease of the CO in the presence of the Increase Inhibit command does not occur when the anti-windup technique of the present invention is used in place of the prior art technique.

As was described above there are chattering with noise problems with the observer based anti-windup technique of the prior art which are corrected by the anti-windup technique of the present invention. There is another problem associated with the observer based anti-windup technique of the prior art. That problem arises when the single controller control scheme includes a feedforward signal and the controller has a high order, that is an order greater than one. A step change in FF signal can cause an unexpected change in the CO if the CO is at a limit. This problem is illustrated in FIG. 9 where the PV and CO are shown along with the FF signal for a high order controller such as a $5^{th}$ order controller.

Figure 9:
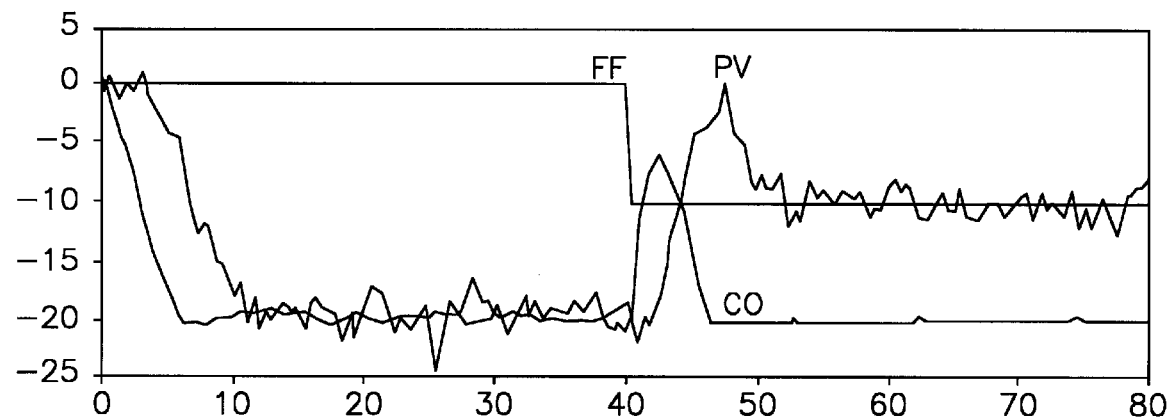
FIG. 9 shows the PV, CO and FF signals for a $5^{th}$ order controller.

Referring now to FIG. 9, there is shown the PV, CO and FF for the $5^{th}$ order controller that implements the weighted minimum variance algorithm:

$$\frac{B(q)}{A(q)} = \frac{b(1 - aq^{-1})}{(b^2 + r^2) - r(a+1)q^{-1} + raq^{-2} - b^2q^{-5}}$$

where a and b are parameters associated with the process model and r is a controller tuning constant. The actual parameters used to produce FIG. 9 were a=0.8, b=0.2, r=1 and the controlled process is a first order lag with dead time. The controller derivation is described by Katebi et al. in *Minimum Variance Control,* The Control Handbook, CRC Press, 1995, pp. 1089–1096.

The deadbeat observer anti-windup technique was used in the control scheme. The SP was selected so that as can be seen from FIG. 9 the controller stays at the lower limit. When the FF signal drops from 0.0 to −10.0, the CO is not supposed to change as the controller is already at the lower limit. As can be seen in FIG. 9 the observer, however, causes a substantial increase in the CO for a few cycles. The resulting change in the CO causes an undesirable disturbance in the process as can be seen from FIG. 9 by the substantial increase in the PV for a few cycles.

The deadbeat observer anti-windup technique is a dynamic system by itself and as such is the cause of the increase in the CO when the FF signal drops from 0.0 to −10.0. When the FF changes sharply, it takes several cycles before the anti-windup calculation converges to a new value. In the mean time, the deadbeat observer overshoots which causes the CO to temporarily, as is shown in FIG. 9, change in the wrong direction.

Figure 10:
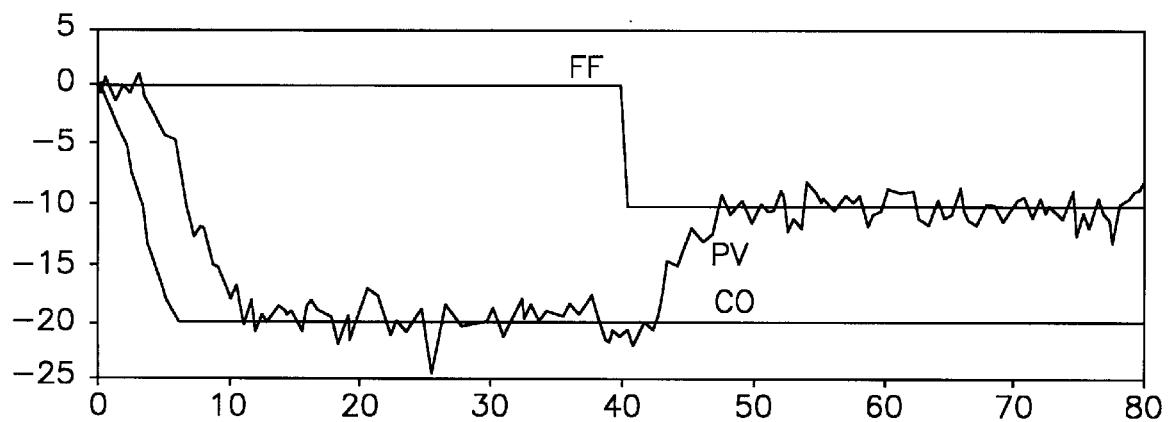
FIG. 10 shows the PV, CO and FF signals for the $5^{th}$ order controller that includes the anti-windup technique of the present invention.

Referring now to FIG. 10, there is shown the PV and CO for the $5^{th}$ order controller that implements the weighted minimum variance algorithm. The control scheme includes the anti-windup technique of the present invention illustrated in FIG. 6 including change detector 60 and accelerator 62. As can be seen from FIG. 10 when the FF signal changes from 0.0 to −10.0, the CO remains at the lower limit and the PV rises but does not exhibit the undesirable disturbance shown in FIG. 9. Therefore, the control scheme does not behave in an undesirable fashion in response to the step change in the FF signal.

It is the inclusion of change detector 60 and accelerator 62 in the anti-windup technique of the present invention that is responsible for the proper behavior of the control scheme in response to the step in the FF signal. Change detector 60 detects if there is a step change in the observer input that requires acceleration by comparing the output of the noise filter 58 with a predetermined sensitivity level. If the sensitivity level is exceeded the detector 60 triggers accelerator 62.

Since this embodiment uses the deadbeat observer antiwindup technique in the control scheme, accelerator 62 when triggered causes the observer calculations to be executed for N cycles where N is the order of the controller transfer function B(q)/A(q). The controller herein is of the $5^{th}$ order. Therefore, accelerator 62 causes controller 64 to execute the observer calculations for five cycles. It should be understood that the five cycles executed by the controller 64 occur in one clock cycle of the system 40.

Where the control scheme uses an characteristic polynomial of the anti-windup observer $A_0(q) \neq q^n$, that is, not the deadbeat observer, the accelerator will cause the controller to execute in one clock cycle of the system a number of cycles that has to be determined experimentally for each system. This number has to be sufficient to cause the observer calculations to converge to a new value.

The above described embodiment for the anti-windup technique of the present invention can also be used to provide windup protection in a multi-layer control system provided that the technique is used on each controller in the system and the previously described Inhibit Increase and Inhibit Decrease commands are also used in the system. There is, however, another embodiment for the technique of the present invention that may be used to provide windup protection in a layered control scheme without the need to use the technique on each individual controller in the system and without the use of the Inhibit Increase and Inhibit Decrease commands. This other embodiment, as will be described in more detail below, can be used in a multi-layer control system provided that the individual controllers in the system can be replaced by a single multivariable controller.

Figure 1:
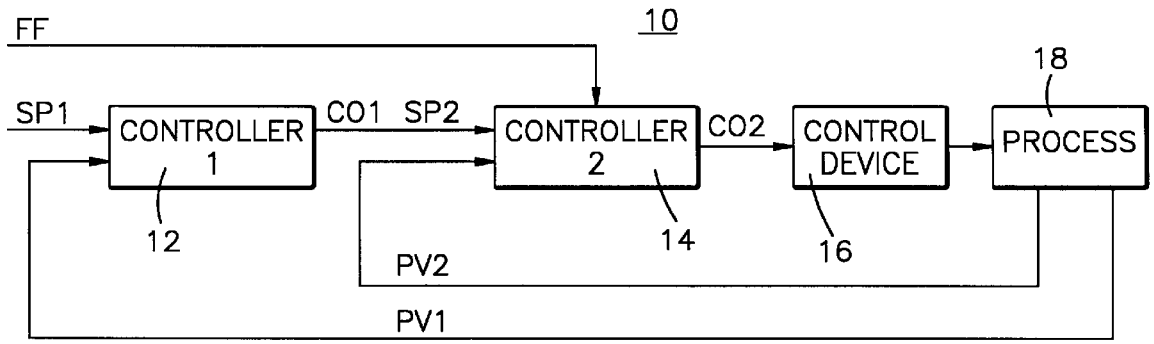
FIG. 1 shows a block diagram for a two layer cascade control system embodied in accordance with the prior art.
Figure 11:
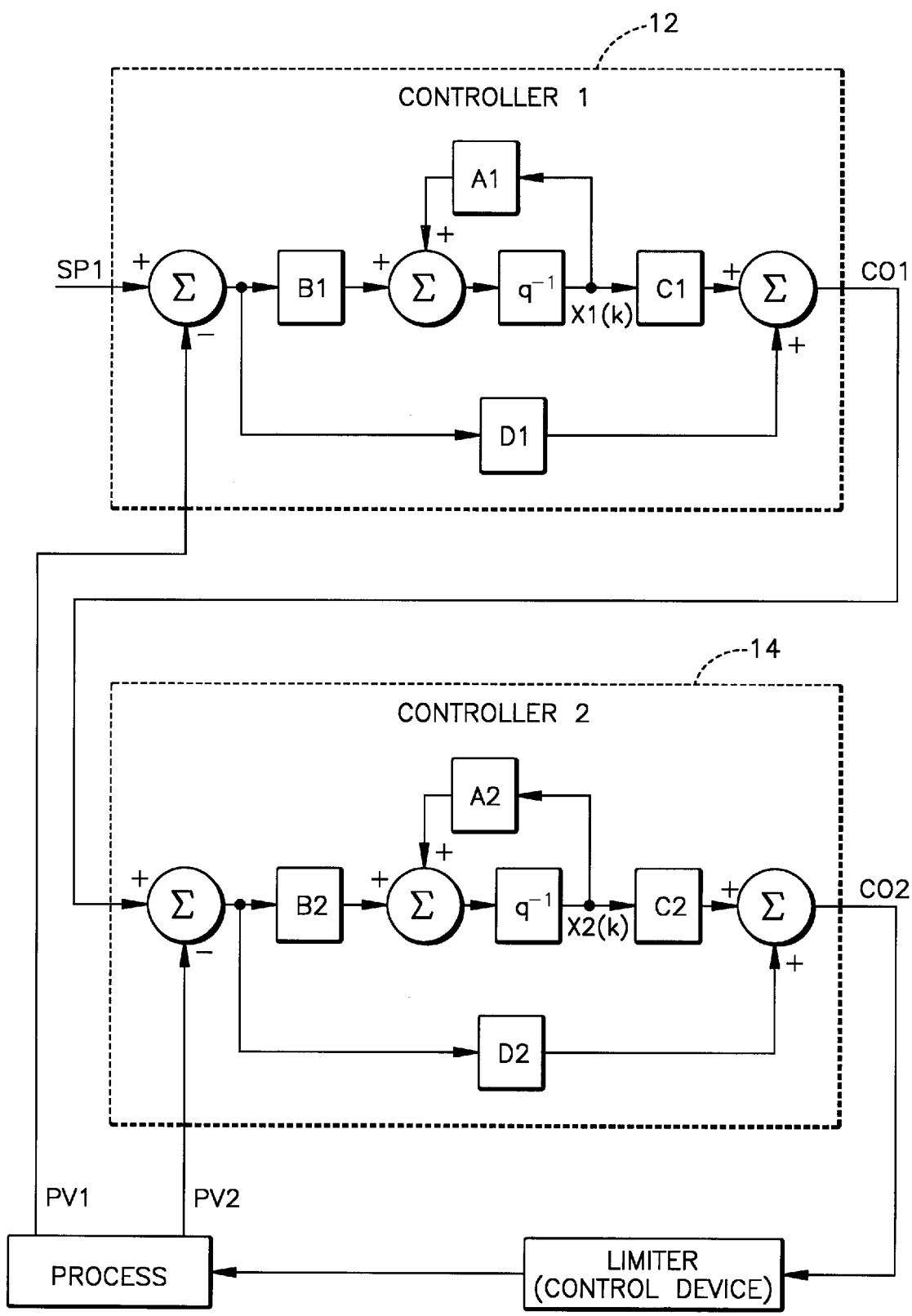
FIG. 11 shows the two layer cascade control system of FIG. 1 wherein both controllers are represented by a state space description.

Referring now to FIG. 11, there is shown the two layer cascade control system 10 of FIG. 1 wherein each of the two controllers 12, 14 are represented by a state space description. This form of representing controllers is described by Astrom et al. in *Computer Controlled Systems*. It is well known to those of ordinary skill in the process control art that any linear digital controller can be equivalently represented by a transfer function or by state space equations.

Each of the controllers 12, 14 can be represented by state space equations as follows:

$E_i(k) = SP_i(k) - PV_i(k)$ $X_i(k+1) = A_i X_i(k) + B_i E_i(k)$ $CO_i(k) = C_i X_i(k) + D_i E_i(k)$ where i=1 or 2 (controller number), SP denotes a setpoint, PV—controlled (process) variable, CO—controller output, X—controller state vector, A, B, C, D—matrices of appropriate dimensions.

In system 10 the controllers 12, 14 can be combined into a single multivariable controller. The single multivariable controller has one setpoint SP1, one output CO2 and two process variables PV1 and PV2 and the present invention can be used in that controller to prevent windup in the layered control system 10. As can be seen from FIG. 11, the control output CO1 of the outer controller 12 is the setpoint SP2 of inner controller 14. This relationship can be used to modify the state space equations of the inner controller 14 as follows:

$E_2(k) = CO_1(k) - PV_2(k)$ $X_2(k+1) = A_2 X_2(k) + B_2 E_2(k) = A_2 X_2(k) + B_2(C_1 X_1(k) + D_1 E_1(k) - PV_2(k))$ $CO_2(k) = C_2 X_2(k) + D_2 E_2(k) = C_2 X_2(k) + D_2(C_1 X_1(k) + D_1 E_1(k) - PV_2(k))$

The controllers 12 and 14 can now be combined into one state space system that has two inputs, E1 and PV2; and one output CO2 as:

$$\begin{bmatrix} X_1(k+1) \\ X_2(k+1) \end{bmatrix} = \begin{bmatrix} A_1 & 0 \\ B_2 C_1 & A_2 \end{bmatrix} \begin{bmatrix} X_1(k) \\ X_2(k) \end{bmatrix} + \begin{bmatrix} B_1 & 0 \\ B_2 D_1 & -B_2 \end{bmatrix} \begin{bmatrix} E_1(k) \\ PV_2(k) \end{bmatrix}$$

$$CO_2(k) = [D_2 C_1 \quad C_2] \begin{bmatrix} X_1(k) \\ X_2(k) \end{bmatrix} + [D_1 D_2 \quad -D_2] \begin{bmatrix} E_1(k) \\ PV_2(k) \end{bmatrix}$$

Figure 12:
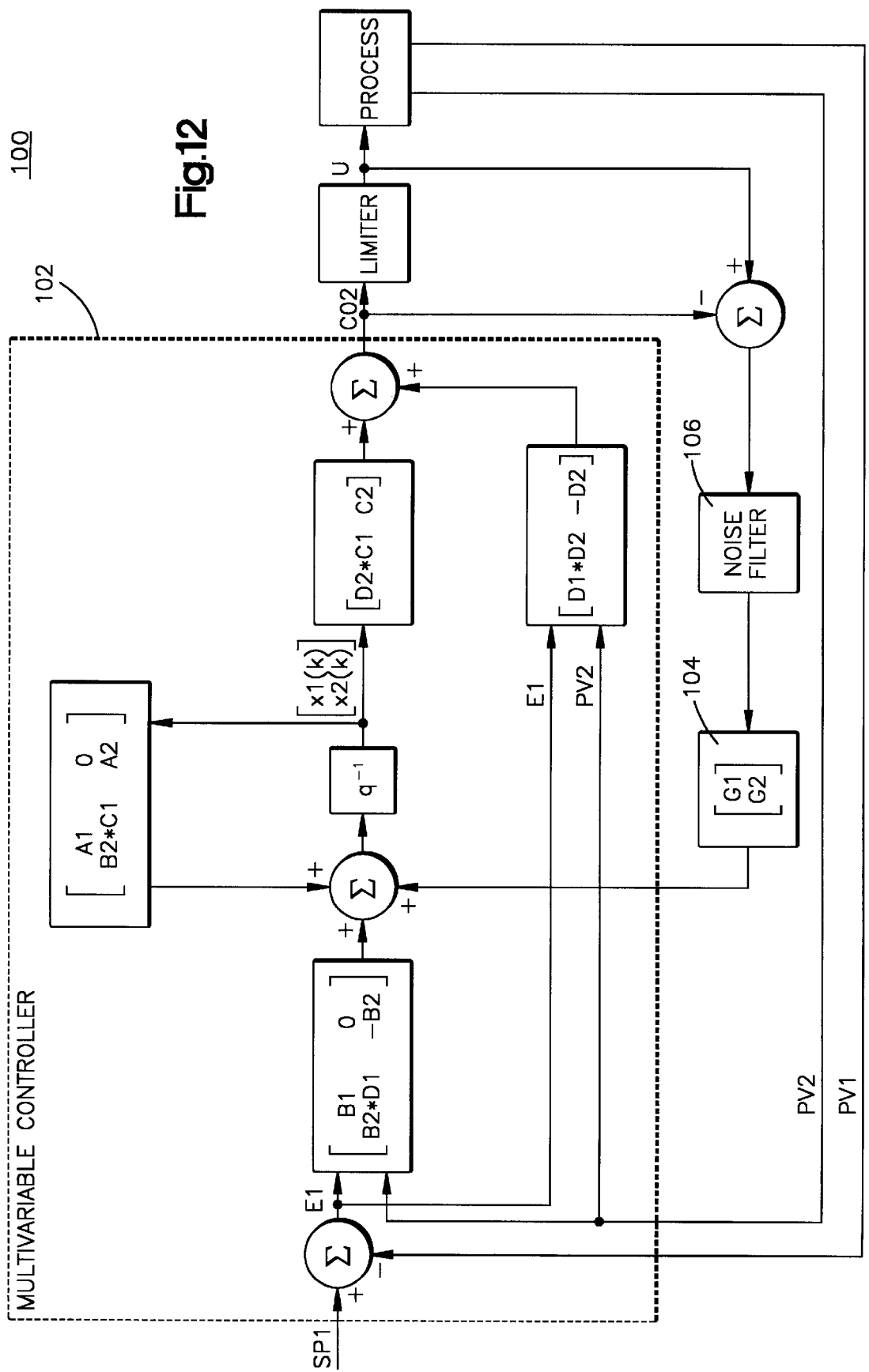
FIG. 12 shows the two layer control system of FIG. 11 where the two controllers are combined into a single multivariable controller with anti-windup protection.

Referring now to FIG. 12 there is shown a system 100 which is the two layer control system 10 of FIG. 11 where controllers 12 and 14 have been combined into a single multivariable controller 102. The anti-windup technique of the present invention has been added to the system of FIG. 12 in the form of block 104 which implements, as did block 48 of FIG. 6, the anti-windup technique. This implementation of the anti-windup technique also includes noise filter 106, which as does filter 58 of FIG. 6, decreases or eliminates output chatter of CO2 at the limit. It should be appreciated that this embodiment does not use the Inhibit Increase or Inhibit Decrease signals and therefore does not exhibit the behavior described in connection with FIG. 4.

The state space equations for system 100 are:

$$\begin{bmatrix} X_1(k+1) \\ X_2(k+1) \end{bmatrix} = \begin{bmatrix} A_1 & 0 \\ B_2 C_1 & A_2 \end{bmatrix} \begin{bmatrix} X_1(k) \\ X_2(k) \end{bmatrix} + \begin{bmatrix} B_1 & 0 \\ B_2 D_1 & -B_2 \end{bmatrix} \begin{bmatrix} E_1(k) \\ PV_2(k) \end{bmatrix} + \begin{bmatrix} G1 \\ G2 \end{bmatrix} *$$

$$NF(U(k) - CO_2(k))$$

$$CO_2(k) = [D_2 C_1 \quad C_2] \begin{bmatrix} X_1(k) \\ X_2(k) \end{bmatrix} + [D_1 D_2 \quad -D_2] \begin{bmatrix} E_1(k) \\ PV_2(k) \end{bmatrix}$$

$$U(k) = \text{Limit}(CO_2(k))$$

where $[G_1, G_2]^T$ is the observer matrix (described by Astrom et al) and function NF( . . . ) represents the noise filter.

One popular form of two layer cascade control system 10 is that in which controllers 12, 14 are implemented as proportional-integral (PI) controllers. Each PI controller can be described by state space equations as follows:

$e(k) = sp(k) - pv(k)$ $x(k+1) = x(k) + k_i e(k)$ $co(k) = x(k) + (k_i + k_p) e(k)$ where $k_i$, $k_p$ denote integral and proportional gains and lower case has been used to indicate scalars.

The two PI controllers can, as is shown in system 110 of FIG. 13, be combined into one multivariable controller 112 described by the general state space equations as follows:

$$\begin{bmatrix} x_1(k+1) \\ x_2(k+1) \end{bmatrix} = \begin{bmatrix} 1 & 0 \\ k_{i2} & 1 \end{bmatrix} \begin{bmatrix} x_1(k) \\ x_2(k) \end{bmatrix} +$$

$$\begin{bmatrix} k_{i1} & 0 \\ k_{i2}(k_{i1}+k_{p1}) & -k_{i2} \end{bmatrix} \begin{bmatrix} e_1(k) \\ pv_2(k) \end{bmatrix} + \begin{bmatrix} g_1 \\ g_2 \end{bmatrix} NF(co_2(k)-u(k))$$

$$co_2(k) = [(k_{i2}+k_{p2})\ 1] \begin{bmatrix} x_1(k) \\ x_2(k) \end{bmatrix} +$$

$$[(k_{i2}+k_{p2})(k_{i1}+k_{p1}) - (k_{i2}+k_{p2})] \begin{bmatrix} e_1(k) \\ pv_2(k) \end{bmatrix}$$

$$u(k) = \text{Limit}(co_2(k))$$

where $g_1$ and $g_2$ are the coefficients of the anti-windup observer and function NF( . . . ) represents the noise filter. As with system 100 of FIG. 12, the system 110 has a block 114 which implements the anti-windup technique and a noise filter 116.

In order to find the coefficients $g_1$ and $g_2$ of the anti-windup observer it is necessary to compute the characteristic polynomial:

$$\det(qI - A + GC) = \det\left(\begin{bmatrix} q & 0 \\ 0 & q \end{bmatrix} - \begin{bmatrix} 1 & 0 \\ k_{i2} & 1 \end{bmatrix} + \begin{bmatrix} g_1 \\ g_2 \end{bmatrix}[(k_{i2}+k_{p2})\ 1]\right)$$

$$= \det\begin{bmatrix} q + g_1(k_{i2}+k_{p2}) - 1 & g_1 \\ g_2(k_{i2}+k_{p2}) - k_{i2} & q + g_2 - 1 \end{bmatrix}$$

$$= q^2 + (g_1(k_{i2}+k_{p2}) + g_2 - 2)q + (1 - g_1 k_{p2} - g_2)$$

where the roots $q_{1\ and\ q2}$ of the characteristic polynomial will define the observer behavior.

For any given roots of the characteristic polynomial, the observer gains can be found from the system of linear equations:

$$(k_{i2}+k_{p2})g_1+g_2=2-q_1-q_2$$

$$k_{p2}g_1+g_2=1-q_1 q_2$$

Specifically, for a deadbeat observer with both roots equal to zero the observer gains are:

$$g_1 = \frac{1}{k_{i2}}$$

$$g_2 = 1 - \frac{k_{p2}}{k_{i2}}$$

It should be noted that the observer gains are independent of the tuning of the outer PI controller 12.

Substituting the above equations for the observer gains into the general state space equations for the multivariable controller 112 gives rise to the specific state space equations for that controller as follows:

$$\begin{bmatrix} x_1(k+1) \\ x_2(k+1) \end{bmatrix} = \begin{bmatrix} 1 & 0 \\ k_{i2} & 1 \end{bmatrix} \begin{bmatrix} x_1(k) \\ x_2(k) \end{bmatrix} +$$

$$\begin{bmatrix} k_{i1} & 0 \\ k_{i2}(k_{i1}+k_{p1}) & -k_{i2} \end{bmatrix} \begin{bmatrix} e_1(k) \\ pv_2(k) \end{bmatrix} + \begin{bmatrix} g_1 \\ g_2 \end{bmatrix} NF(co_2(k)-u(k))$$

$$co_2(k) = [(k_{i2}+k_{p2})\ 1] \begin{bmatrix} x_1(k) \\ x_2(k) \end{bmatrix} +$$

-continued $$[(k_{i2}+k_{p2})(k_{i1}+k_{p1}) - (k_{i2}+k_{p2})] \begin{bmatrix} e_1(k) \\ pv_2(k) \end{bmatrix}$$

$$u(k) = \text{Limit}(co_2(k))$$

It is to be understood that the description of the preferred embodiments are intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for preventing windup in a control system having a single controller characterized by the general linear transfer function B(q)/A(q), said controller having a control output before limiting, said control system also having a limiting device responsive to said control output before limiting for providing a control output after limiting, and a summing point for providing an error signal which is the difference between a setpoint and a process variable to the input of said controller, said method comprising the steps of:

a. implementing a transfer function in the form of:

$$[A_0(q)-A(q)]/B(q)$$

where $A_0(q)$ is the characteristic polynomial of the anti-windup observer and B(q) and A(q) are the numerator and denominator in said general linear transfer function B(q)/A(q); and b. connecting said implemented transfer function to said control system so that said implemented transfer function receives as an input signal the difference between said control output after limiting and said control output before limiting and provides an output signal additively to said error signal.

2. A method for preventing windup in a control system for a process, said control system having N controllers, where $N \geq 2$, each in a respective one of N layers ranging from lowest to highest, each of said N controllers having an associated control output and inputs which are a setpoint and a process variable, said control system also having a limiter for providing from said control output from said lowest layer controller a limited control output to said process, said process variable for each of said N controllers from said process, each of said N controllers, except for said controller in said lowest layer, providing said associated control output as said setpoint input for the one of said N controllers which is in the next adjacent lower layer, said setpoint input for the one of said N controllers in said highest of said N layers received from a source external to said control system, said method comprising the steps of:

a. representing each of said N controllers by a state space description;

b. combining said state space description representing N controllers into a single multivariable controller having a setpoint input which is said setpoint input from said external source, a control output which is said lowest layer controller control output, and said process variable for each of said N controllers from said process;

c. applying to said single multivariable controller an observer based anti-windup technique which has an input; and d. including a noise filter connected to said input of said observer based anti-windup technique.

3. The method of claim 2 wherein N=2, the second layer is said lowest layer and each of said two controllers is represented by state space equations as follows:

$$E_i(k) = SP_i(k) - PV_i(k)$$

$$X_i(k+1) = A_i X_i(k) + B_i E_i(k)$$

$$CO_1(k) = C_i X_i(k) + D_i E_i(k)$$

where i=1 or 2 (controller number), SP denotes said setpoint, PV said process variable, CO said associated control output, X is the state vector of said controller, and A, B, C, D are matrices of appropriate dimensions.

4. The method of claim 3 wherein said single multivariable controller is represented by state space equations as follows:

$$\begin{bmatrix} X_1(k+1) \\ X_2(k+1) \end{bmatrix} = \begin{bmatrix} A_1 & 0 \\ B_2 C_1 & A_2 \end{bmatrix} \begin{bmatrix} X_1(k) \\ X_2(k) \end{bmatrix} + \begin{bmatrix} B_1 & 0 \\ B_2 D_1 & -B_2 \end{bmatrix} \begin{bmatrix} E_1(k) \\ PV_2(k) \end{bmatrix}$$

$$CO_2(k) = [D_2 C_1 \quad C_2] \begin{bmatrix} X_1(k) \\ X_2(k) \end{bmatrix} + [D_1 D_2 \quad -D_2] \begin{bmatrix} E_1(k) \\ PV_2(k) \end{bmatrix}$$

where $CO_2$ is said control output of said one of said two controllers which is in said second layer, $PV_2$ is said process variable from said process for said one of said two controllers which is in said second layer, and $E_1$ is the difference between said setpoint input from said external source and said process variable from said process for said one of said two controllers which is in said first layer.

5. The method of claim 2 wherein each of said N controllers is a PI controller, N=2, the second layer is said lowest layer and each of said two PI controllers is represented by a state space equation as follows:

$$e(k) = sp(k) - pv(k)$$

$$x(k+1) = x(k) + k_i e(k)$$

$$co(k) = x(k) + (k_i + k_p) e(k)$$

SP denotes said PI controller setpoint input, PV said PI controller process variable input, CO said PI controller control output, X is the state vector of said controller, and $k_i$, $k_p$ denote integral and proportional gains of said PI controller.

6. The method of claim 5 wherein said single multivariable controller is represented by state space equations as follows:

$$\begin{bmatrix} x_1(k+1) \\ x_2(k+1) \end{bmatrix} = \begin{bmatrix} 1 & 0 \\ k_{i2} & 1 \end{bmatrix} \begin{bmatrix} x_1(k) \\ x_2(k) \end{bmatrix} +$$

$$\begin{bmatrix} k_{i1} & 0 \\ k_{i2}(k_{i1}+k_{p1}) & -k_{i2} \end{bmatrix} \begin{bmatrix} e_1(k) \\ pv_2(k) \end{bmatrix} + \begin{bmatrix} g_1 \\ g_2 \end{bmatrix} (co_2(k) - u(k))$$

$$co_2(k) = [(k_{i2}+k_{p2}) \quad 1] \begin{bmatrix} x_1(k) \\ x_2(k) \end{bmatrix} +$$

$$[(k_{i2}+k_{p2})(k_{i1}+k_{p1}) - (k_{i2}+k_{p2})] \begin{bmatrix} e_1(k) \\ pv_2(k) \end{bmatrix}$$

$$u(k) = \text{Limit}(co_2(k))$$

where $CO_2$ is said control output of said one of said two PI controllers which is in said second layer, $PV_2$ is said process variable from said process for said one of said two PI controllers which is in said second layer, and $E_1$ is the difference between said setpoint input from said external source, said process variable from said process for said one of said two PI controllers which is in said first layer and $g_1$ and $g_2$ are the gain coefficients of said observer based anti-windup technique.

7. The method of claim 6 wherein said observer based anti-windup technique is a deadbeat observer having both roots equal to zero and said gain coefficients $g_1$ and $g_2$ are:

$$g_1 = \frac{1}{k_{i2}}$$

$$g_2 = 1 - \frac{k_{p2}}{k_{i2}}.$$

8. A method for preventing windup in a control system for a process, said control system having N controllers where $N \geq 2$, an ith of said N controllers having a setpoint $SP_i$, a process variable $PV_i$ from said process and a control output COi for each i such that $1 \leq i \leq N$, where the control output of said ith controller is connected to the setpoint of the adjacent controller such as $CO_i = SP_{i+1}$ for each i such that $1 \leq i \leq N-1$, the setpoint of controller 1, $SP_1$, is from a source external to said control system and the control output of the Nth controller, $CO_N$, is connected to a limiter whose output is connected to said process, said method comprising the steps of:

a. representing each of said N controllers by a state space description;

b. combining said state space description representing N controllers into a single multivariable controller having a setpoint input which is said setpoint of controller 1, $SP_1$, a control output which is said control output of the Nth controller, $CO_N$, and said process variable for each of said N controllers from said process;

c. applying to said single multivariable controller an observer based anti-windup technique having an input; and d. including a noise filter connected to said input of said observer based anti-windup technique.

9. A control system having anti-windup prevention comprising:

a. a single controller characterized by the general linear transfer function B(q)/A(q), said controller having a control output before limiting;

b. a limiting device responsive to said control output before limiting for providing a control output after limiting;

c. a first summing point for providing an error signal which is the difference between a setpoint and a process variable to the input of said controller; and d. an anti-windup preventing device having an anti-windup transfer function in the form of:

$$[A_0(q) - A(q)]/B(q)$$

where $A_0(q)$ is the characteristic polynomial of the anti-windup observer and B(q) and A(q) are the numerator and denominator in said general linear transfer function B(q)/A(q), said anti-windup preventing device receiving as an input signal the difference between said control output after limiting and said control output before limiting and providing an output signal additively to said error signal.

10. The control system of claim 9 wherein said anti-windup preventing device comprises a noise filter for receiving said difference between said control output after limiting and said control output before limiting and providing a filtered signal therefrom and a device implementing said anti-windup transfer function which receives said filtered signal and provides said anti-windup prevent device output signal additively to said error signal.

11. The control system of claim 10 wherein said noise filter implements a deadband DB.

12. The control system of claim 11 wherein said characteristic polynomial of the anti-windup observer is:

$$A_o(q)=q^n.$$

13. The control system of claim 9 further comprising a second summing point for providing an output signal which is a feedforward signal added to said control output before limiting, said limiting device providing said control output after limiting from said second summing point output signal, said input signal to said anti-windup preventing device the difference between said control output after limiting and said second summing point output signal.

14. The control system of claim 9 having a system clock with a predetermined cycle, said control system executing each of said predetermined system clock cycles, wherein said controller is of a order greater than one and said system further comprises a detector connected to receive said input signal to said anti-windup preventing device and provide an output signal when a step change is detected in said input signal and an accelerator connected to receive said step change detector output signal, said accelerator causing when said step change detector output signal is received said single controller to execute a predetermined number of cycles within one of said predetermined system clock cycles.

* * * * *